(12) United States Patent
Bloecher

(10) Patent No.: US 6,954,176 B2
(45) Date of Patent: Oct. 11, 2005

(54) DEVICE AND METHOD FOR AN ANTENNA ARRAY WITH SWITCHABLE WIDE-ANGLE COVERAGE

(75) Inventor: Hans Bloecher, Käthe-Kollwitz-Weg (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/979,564
(22) PCT Filed: Mar. 13, 2001
(86) PCT No.: PCT/DE01/00952
§ 371 (c)(1), (2), (4) Date: Nov. 14, 2001
(87) PCT Pub. No.: WO01/69798
PCT Pub. Date: Sep. 20, 2001

(65) Prior Publication Data
US 2002/0105462 A1 Aug. 8, 2002

(30) Foreign Application Priority Data
Mar. 14, 2000 (DE) .......................... 100 12 080

(51) Int. Cl.⁷ .............................. H01Q 3/02; G01S 5/02
(52) U.S. Cl. ......................... 342/374; 342/427; 342/434
(58) Field of Search ................................ 342/434, 427, 342/153, 154, 155, 374, 383, 384, 372

(56) References Cited

U.S. PATENT DOCUMENTS

| | | | | |
|---|---|---|---|---|
| 3,176,297 A | * | 3/1965 | Forsberg | 343/371 |
| 3,293,648 A | * | 12/1966 | Kuhn | 342/368 |
| 3,343,165 A | * | 9/1967 | Sleeper, Jr. | 342/153 |
| 3,438,044 A | * | 4/1969 | Elia et al. | 342/370 |
| 3,594,811 A | * | 7/1971 | Pierrot | 342/350 |
| 3,710,390 A | * | 1/1973 | Kreinheder | 342/150 |
| 3,906,508 A | * | 9/1975 | Foldes | 343/786 |
| 4,028,624 A | | 6/1977 | Saint-Lot | |
| 4,359,742 A | * | 11/1982 | Smith | 343/768 |
| 4,766,437 A | * | 8/1988 | Schmidt et al. | 342/368 |
| 5,943,011 A | * | 8/1999 | Acoraci et al. | 342/373 |
| 6,266,010 B1 | * | 7/2001 | Ammar et al. | 342/374 |
| H2033 H | * | 7/2002 | Masak et al. | 126/348 |

FOREIGN PATENT DOCUMENTS

FR 2 781 087 1/2000 ............ H01Q/3/26

OTHER PUBLICATIONS

Merrill, I. Skolnik: "Radar Handbook", 1990, McGraw–Hill, Inc., New York.

* cited by examiner

Primary Examiner—Gregory C. Issing
(74) Attorney, Agent, or Firm—Pendorf & Cutliff

(57) ABSTRACT

In order in simple manner to switchably cover a wide angle in sectors using an antenna array with broad main lobe, an antenna elements are so arranged, that the elements can be individually selected, so that some elements of the array can be operated in-phase and other elements operated in phase-opposition relative to each other. In order to determine the entry direction of a received signal, it is possible to operate the antenna array with non-symmetric antenna diagram, or however also to additively influence the symmetry of antenna characteristic by the use of a supplemental receiver element.

8 Claims, 3 Drawing Sheets

DEVICE AND METHOD FOR AN ANTENNA ARRAY WITH SWITCHABLE WIDE-ANGLE COVERAGE

BACKGROUND OF THE INVENTION

1. Field of the Invention

The invention concerns a device and process for an antenna array with switchable wide angle or directional characteristic, comprised of individual antennas for increasing the directional resolution and angular coverage, in the sense of monopulse-antenna, of which the total antenna mean radiation pattern or directional characteristic is characterized by a sum diagram and a differential diagram, wherein the individual antennas are connected via a network of phase-shifters or hybrid junctions, wherein the antenna array includes a sum input for selecting the individual antennas, so that the antenna mean radiation pattern or directional characteristic exhibits a sum diagram, and wherein the antenna array includes a differential input for selecting the individual antennas so that the antenna mean radiation pattern or directional characteristic exhibits a differential diagram.

In automobile short-range sensor technology, as well as in mobile communications, there is an increasing demand for sector-wide coverage of large angle areas. This problem is presently addressed by the employment of separate individual antennas respectively serving sectors. If the antenna characteristic (this term being used herein to mean aerial radiation pattern or directional characteristic) is to be switchable and/or adaptively adjustable, or, as the case may be, if for space saving or aesthetic reasons a large number of individual antennas is not appropriate, then antenna arrays must be employed. In the case of large main lobe breadths and large slewing angles, the slewing angle which can be realized is strongly limited on the basis of strongly increasing "grating-lobes".

2. Description of the Related Art

The conventional technique for solving this problem involves employment of conformal, or angle preserving, array antennas. Such antennas presently remain in part in the research stage or are still too expensive for employment in series production.

From U.S. Pat. No. 4,044,359 a device is known, which is designed for suppressing interfering signals. Herein, by the targeted interaction of two antenna systems, directional information is obtained, which is subsequently used for improved suppression of interfering transmissions.

In the reference by Kuga et al. (Kuga, Nobuhiro et al., Beam-Switched planar array antenna for mobile communications, Electronics and Communications in Japan, Part 1, Vol. 81, No. 3, 1998, pp 57–63) an antenna array with large angle coverage is described, wherein the individual angular distributions are covered by means of the switchable arrangement of antenna groups, which exhibit two switchable antenna characteristics respectively offset by 180°. For example, herein two antenna groups arranged at right-angles to each other are shown, wherein these four segments cover an angle area of 360°.

Patent publication DE 27 09 758 B2 shows an emitter group arranged in a circular shape for finding the azimuthal direction. Herein already multiple antennas lying along a segment of a circle are assembled into an emitter group and driven via a circuit matrix network. These individual emitter groups are driven in the sense of a monopulse antenna, which utilizes a sum diagram and one single differential diagram. The high angular resolution of the antenna array is herein achieved by suitable arrangement (here circular shaped, for angle coverage of 360°) of the individual emitter groups and by the comparison of the respective received signals with each other.

In the literature, Skolnik (Skolnik, M., Radar Handbook, $2^{nd}$ ed., McGraw-Hill Inc., New York) describes diverse antenna arrays which are suitable for operation as monopulse antennas (see in particularly p. 6.24, table 6.1). It is herein however presumed according to FIG. 6.19 (p. 6.23), that the antenna arrays utilize one sum and one individual differential characteristic. As for the particularly noteworthy feature, reference is made to the problem arising with respect to the directional effect of the antenna characteristic, which is based upon the fact that during the dimensioning of the antenna a compromise must be found between the efficiency of the summation characteristic of the antenna and the differential characteristic of the antenna.

The conference handout of Hannan (Hannan, P., Loth, P., A Monopulse Antenna Having Independent Optimization of the Sum and Difference Modes, IRE Int. Conv. Rec., pt.1, March 1961) concerns the problem of finding an optimal compromise with respect to the efficiency of sum and differential characteristics of the antenna diagram. For this, an antenna array is described, which is comprised of individual antennas, which are connected with each other at a fixed phase relationship via coupling with a network comprised of a hybrid junctions. In this manner it is achieved that the angle area of the emission lobe of the differential characteristic is efficiently narrowed.

The selection schematics which can be found in the literature are always based on the presumption that there will always be two groups of antenna elements provided next to each other and arranged counter-phasic to each other.

SUMMARY OF THE INVENTION

It is thus the task of the invention to provide a process and a suitable device, with which it becomes possible to sector-wise cover a large angle area with conventional high frequency elements and antenna elements.

This task is solved in that at least one of the phase shifters or hybrid junctions of the network is switchable, so that the antenna mean radiation pattern or directional characteristic exhibits further differential diagrams by the resulting change of the phase behavior due the selection of the individual antennas, or in that at least one of the phase shifter or hybrid junctions of the network is switched, such that the antenna mean radiation pattern or directional characteristic exhibits further differential diagrams due to the resulting change of the phase behavior upon the selection of the individual antennas. In accordance therewith antenna elements are driven such that the individual elements are individually operable and can be selected to be either in-phase or in phase-opposition relative to each other.

BRIEF DESCRIPTION OF THE DRAWINGS

Beginning with an equally spaced arrangement of four antenna elements, the invention will be described in greater detail in the following on the basis of the illustrative embodiments shown in the figures. There is shown FIG. 1 the simulated antenna diagrams, depending upon differing selections of the antenna elements, FIG. 2 a schematic circuit diagram of the inventive device and FIG. 3 an exemplary embodiment of the inventive device.

DETAILED DESCRIPTION OF THE INVENTION

Of course the invention is not limited to the provision and control of precisely four antenna elements, but rather can be expanded to any other number of elements as required.

The below discussed illustrative embodiment is based upon an equally distanced arrangement of four antenna elements. In order to represent an in-phase or, as the case may be, phase-opposition selection of the elements, in the following the symbols '+' and '−' are employed, wherein the elements indicated with the same symbol are driven in-phase to each other and at the same time are driven 180° phase delayed in phase-opposition to the other antenna elements.

Figure 1:
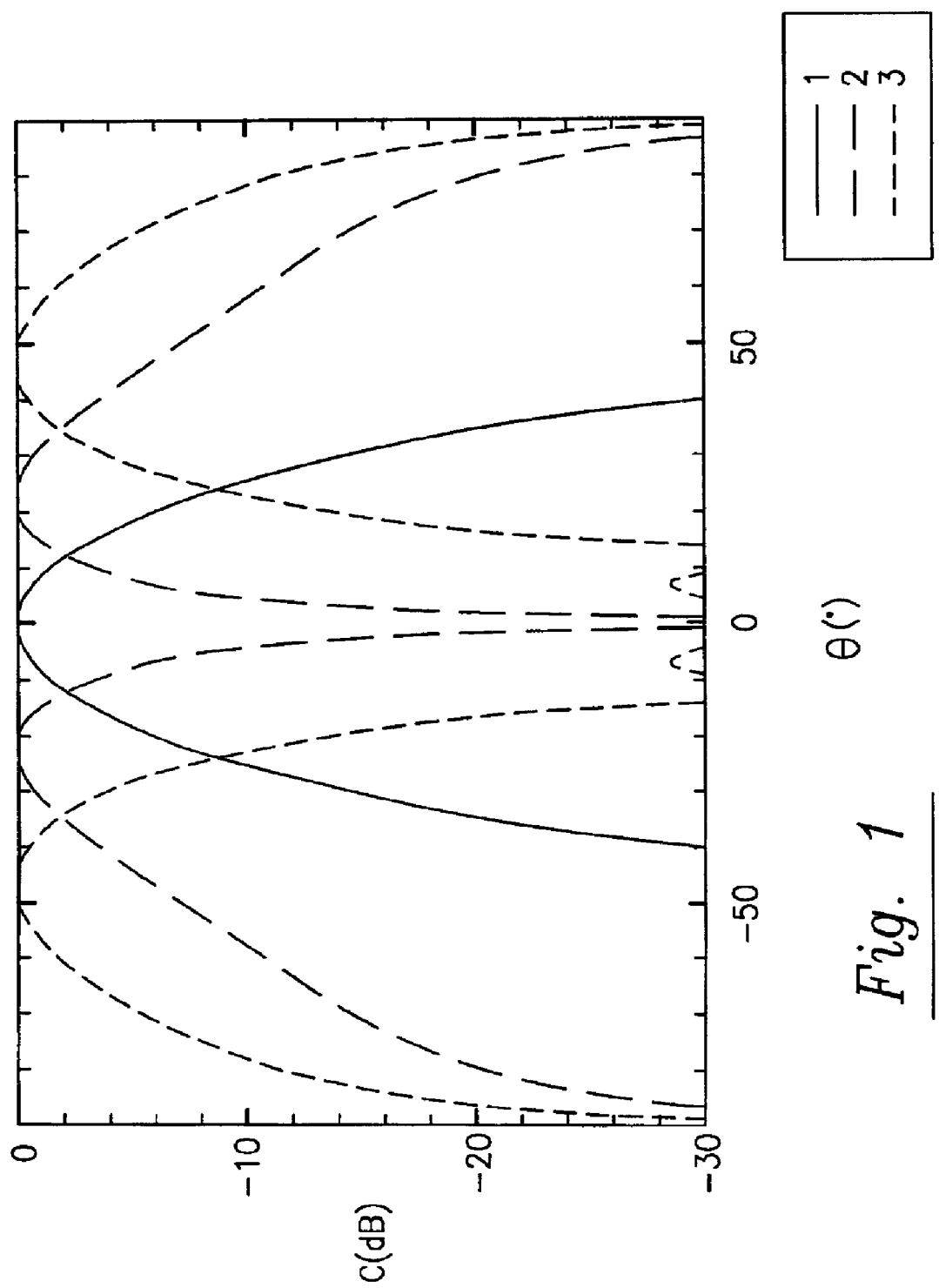

FIG. 1 shows antenna diagrams with respect to three differing selects of the antenna elements. This concerns an arrangement or array of micro strip conductors which are arranged in four lines or rows and are spaced apart with the 0.54 multiple of the wave length of the operating frequency. By constructive measures the side lobes of the antenna arrangements were surpressed by 8 dB (Tapering: Cos on Pedestal).

In a case of the in-phase driving of all elements (++++) an antenna diagram with a broadside main lobe 1 is produced. Another antenna diagram 2 is produced by an alternating in-phase/counter-phase driving of the elements (++−−). This diagram 2 includes two identical main lobes, which diverge by ±30° from the main emission direction of the broadside main lobe 1. By alternating in-phase/counter-phase driving of the elements (+−+−) two identical main lobes are produced as shown in diagram 3 deviating form the main emission direction of the broadside main lobe 1 by ±60°.

From this variability of the orientation or directionality of the antenna main lobe there results a coverage of a angle area of approximately −70° to +70° in a spatial plane, in the case of the employment of antenna elements with main lobe breadths (broadside) of approximately 30°. The total angle area can thus in this case be divided into five switchable sectors. In advantageous manner this relationship can be realize by means of the arrangement of a planar array, which is comprised of four antenna elements, which are arranged in a row with a separation of 0.54 λ (λ=wave length of the emitted wave) to each other. Therein the antenna elements can be single emitters or also antenna rows.

Figure 2:
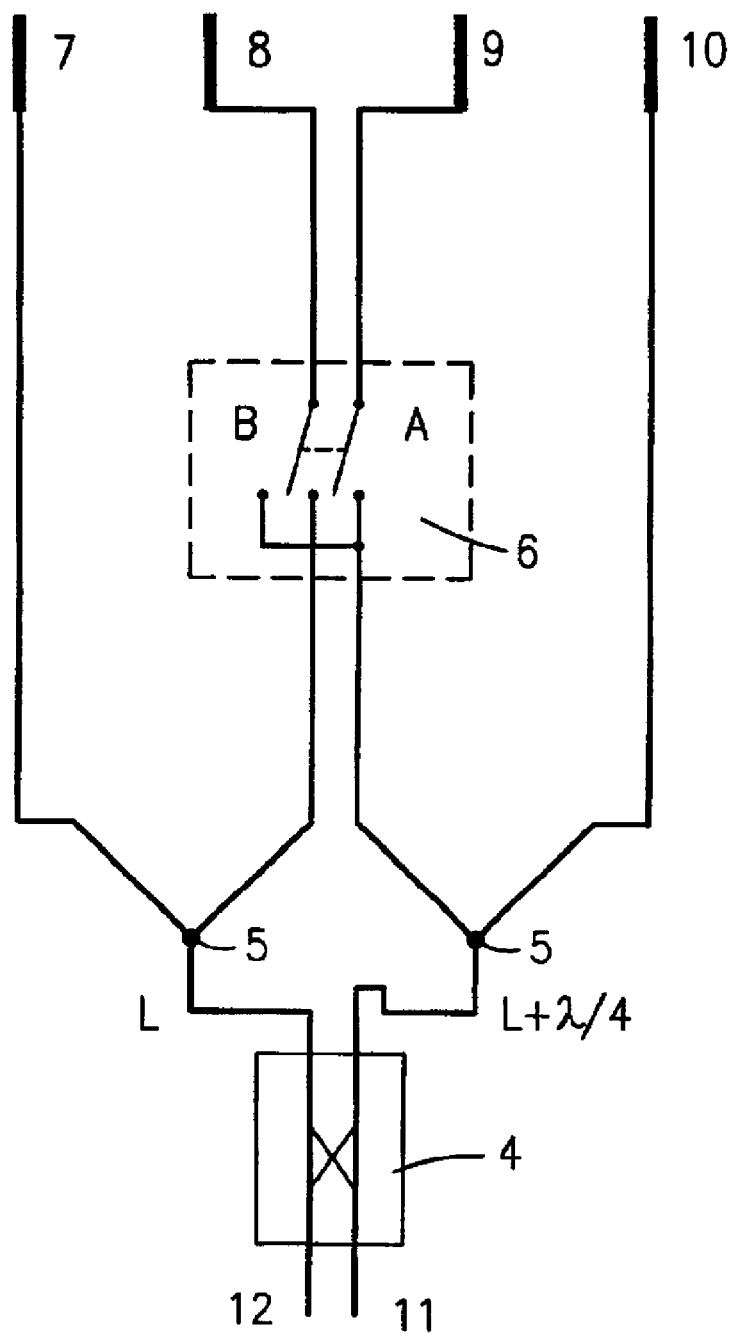

FIG. 2 shows a schematic circuit diagram for the inventive device. The device is comprised of a 3 dB four grid hybrid junction 4, two three grid power dividers 5, a change-over or reversing switch 6 for alternating connection of the input and output of the antenna elements 8 and 9, the antenna elements (single emitters or lines) 7 through 10, as well as the connecting lines between the components. The effective connecting line lengths between the antenna elements 7 through 10 and the inputs of the three grid power divider 5 are the same length, in order to take under consideration the influence of the change-over switch. By the connection of the three grid power divider 5, the inputs of the 3 dB four grid hybrid junction 4 are connected with the three grid power divider 5 with and without a λ/4-detour line. Thereby, at the outputs of the 3 dB four grid hybrid junction 4, the sums and differences of the input signals can be taped off. This corresponds to a phase-monopulse circuit.

The inventive device can be used for sending as well as for receiving operations. The in-phase selection (++++) of the antenna elements 7 through 10 is therein independent of the position of the change-over switch. The communication between the sender-receiver electronics and the antenna elements 7 through 10 occurs in this case via the sum channel 11. The in-phase/phase-opposition selection (++−− or, as the case may be, +−+−) of the antenna elements 7 through 10 is on the other hand controlled by the switch 6. The communication between the sender/receiver electronics and the antenna elements 7 through 10 occurs in both cases of the in-phase/phase-opposition selection via the differential channel 12. Therein the positioning of the switch 6 into position A results in a selection pattern (++−−) which results in the antenna diagram 2 shown in FIG. 1. The positioning of the switch 6 into position B subsequently produces the selection signal (+−+−), which produces antenna diagram 3.

Figure 3:
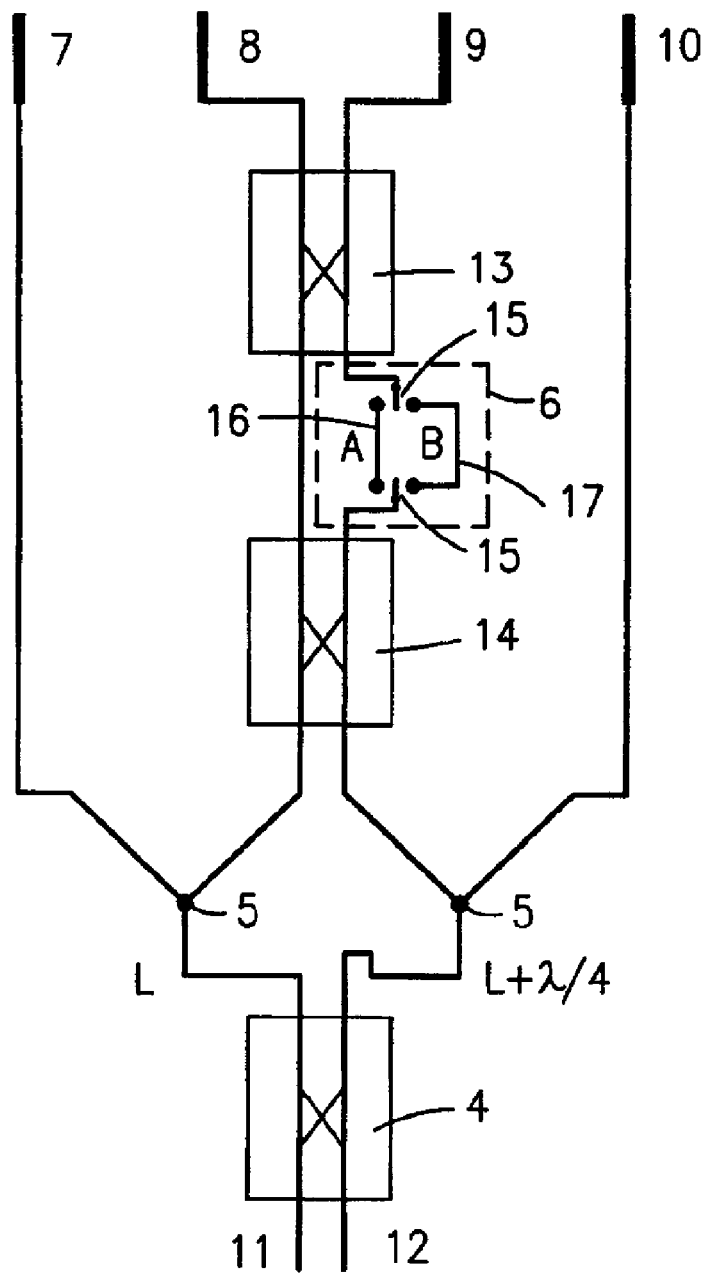

One possibility of an advantageous embodiment of the inventive device is shown in FIG. 3. The embodiment shown here corresponds essentially to the schematic circuit diagram of the inventive device shown in FIG. 2, with the difference that here the double switch 6 is realized by two 3 dB hybrid junctions 13 and 14, two switches 15 operated in synchrony, and two conductor segments 16 and 17. The two conductor segments 16 and 17 are shown differing in the length, so that the length difference corresponds to an uneven multiple of the half wave length of the waves conductor through the device. The two 3 dB hybrid junctions 13 and 14 are herein switched in series, wherein one output of 13 is coupled directly with one input of 14, while the coupling of the other output from 13 occurs via be switch 15 and one of the two conductor segments 16 or 17.

According to the example represented in FIG. 2, the position of the switch 6 in position A corresponds to a selection pattern (++−−), which results in the antenna diagram 2 represented in FIG. 1. The position of the switch 6 in position B, which results in a longer conductor path by λ/2 in comparison to switch position A (180° phase shift), produces as a consequence the selection pattern (+−+−), which produces antenna diagram 3. The switch 6 can be constructed as a simple double switch according to FIG. 3, which makes it possible to switch between one circuit of the length L and one circuit of the length L+λ/2 (wherein λ corresponds to the half of the operating frequency of the antenna arrangement). On the other hand, it is also conceivable to realize the switch 6 by means of the switching of a 3 dB hybrid junction.

During an operation of a sender/receiver unit generally a determination of the direction of entry of a received wave is of interest, that is, it is to be determined in which of the main lobes of the antenna arrangement the wave would enter. This is above all difficult to determine when, as in the inventive device, the individual main lobes of the antenna arrangement are constructed identically. In order to determine an entry direction, it would for example be possible, according to the phase-monopulse process, to measure the phase angle of the output of the differential channel.

In advantageous manner it is possible also to employ the possibility of the individual control of the inventive device in such a manner that the antenna diagram is deformed by a non-symmetric selection (for example: (+++−)) of the antenna elements 7 through 10. The entry direction of the received wave can then be determined by a comparison of the change of the received signal at the output of the differential channel with the signal which is received via the undeformed antenna diagram. For producing the non-symmetric switching, (for example: (+++−)), a switchable 180° detour line could in advantageous manner be provided in the input to antenna element 9. If then this detour line is employed together with the selection according to switch position A then there results the non-symmetric antenna diagram.

It is however also conceivable, to further develop the inventive device in such a manner, that one single or individual antenna element is placed with suitable spacing beside the antenna array, so that in the additive complete diagram of the antenna arrangement one of the two main lobes is completely or partially suppressed. From a comparison of the output signal of the device without taking into consideration the supplemental antenna element, with the additive output signal of the total device, the entry or reception direction of the received signal can be determined.

What is claimed is:

1. A monopulse antenna array comprised of individual antennas for increasing the directional resolution and angular coverage, of which the radiation directional characteristic is characterized by a sum diagram and a differential diagram, wherein the individual antennas are connected via one or more phase-shifters and one or more hybrid junctions, wherein the antenna array includes a sum input for selecting the individual antennas, so that the radiation directional characteristic exhibits a sum diagram, wherein the antenna array includes a differential input for selecting the individual antennas so that the radiation pattern exhibits a differential diagram, wherein at least one of the phase shifters or hybrid junctions is switchable, so that the radiation directional characteristic exhibits further differential diagrams by the resulting change of the phase behavior due to the selection of the individual antennas, wherein the means by which the individual antennas are connected with each other comprises a 3 dB four-grid hybrid junction, two three-grid power dividers (5), a switch (6) for the alternating connection of inputs and outputs of a first set of said antennas (8) and (9), a second set of antennas (7) and (10), as well as the connecting lines between said antennas, junctions, dividers, and switch, wherein the connecting line length between the second set of antennas (7) and (10) and the inputs of the three-grid power dividers (5) are equal in length, in order to take into consideration the switch (6), and wherein the inputs of the four-grid 3 dB hybrid junction (4) are connected with the three-grid power divider (5) with and without a $\lambda/4$-detour line.

2. An antenna array according to claim 1, wherein a double switch (6) is realized by first and second 3 dB hybrid junctions (13) and (14), two switches (15) driven in synchrony, and two circuit segments (16) and (17), wherein the two circuit segments (16) and (17) differ in their length so that the length difference corresponds to an uneven multiple of the half wave length of the waves passing through the array, and wherein the first and second 3 dB hybrid junctions (13) and (14) are switched in series, so that one output from the first hybrid junction (13) is directly coupled with the input from the second hybrid junction (14), while a coupling of the other output from the first hybrid junction (13) and one of the two circuit segments (16) or (17) occurs via the switch (15).

3. An antenna array according to claim 1, wherein the switch (6) is a simple two way switch, with which it is possible to switch between a circuit of length L and a circuit of length $L+\lambda/2$.

4. An antenna array according to claim 3, wherein the switch (6) is a 3 dB hybrid junction.

5. An antenna array according to claim 1, wherein for increasing the directional resolution, the antenna array is supplemented with an additional separate antenna element, and wherein this antenna element is positioned with such a spacing from the antenna array that, wherein the combined radiation path of said array comprises a plurality of lobes, and in the combined radiation pattern of said array and, said additional antenna element one of said main lobes is at least partially suppressed.

6. A process for operating a monopulse antenna array consisting of individual antennas in order to enhance the directional resolution and angular coverage, of which the radiation directional characteristic is associated with a sum diagram and a differential diagram, the process comprising:

connecting the individual antennas with each other via at least one phase shifter and at least one hybrid junction, such that the radiation directional characteristic of the antenna array during selection via a sum input produces a sum diagram, and such that the radiation directional characteristic of the antenna array upon selection of a differential input produces a differential diagram, and such that at least one of the phase shifter or hybrid junctions is switchable such that the radiation directional characteristic exhibits further differential diagrams due to the resulting change of the phase behavior upon the selection of the individual antennas, further comprising determining the entry direction of a received signal by:

driving the antenna elements non-symmetrically, so that the antenna diagram is deformed, and comparing the change of the thus received signal at the differential channel with the signal received via the undeformed sum or differential channel.

7. A process according to claim 6, further comprising measuring the phase angle of the output of the differential channel for determining the entry direction of a received signal.

8. A process according to claim 6, comprising placing a supplemental antenna element with suitable spacing beside the antenna array, wherein the combined radiation path of said array comprises a plurality of lobes, and in the combined radiation pattern of said array and said additional antenna element one of said main lobes is at least partially suppressed, and comparing the output signal of the device without taking into consideration the supplemental antenna element, with the additive output signal of the total device with the supplemental antenna element, to thereby determine the entry direction of the received signal.

* * * * *